Patented Feb. 14, 1939

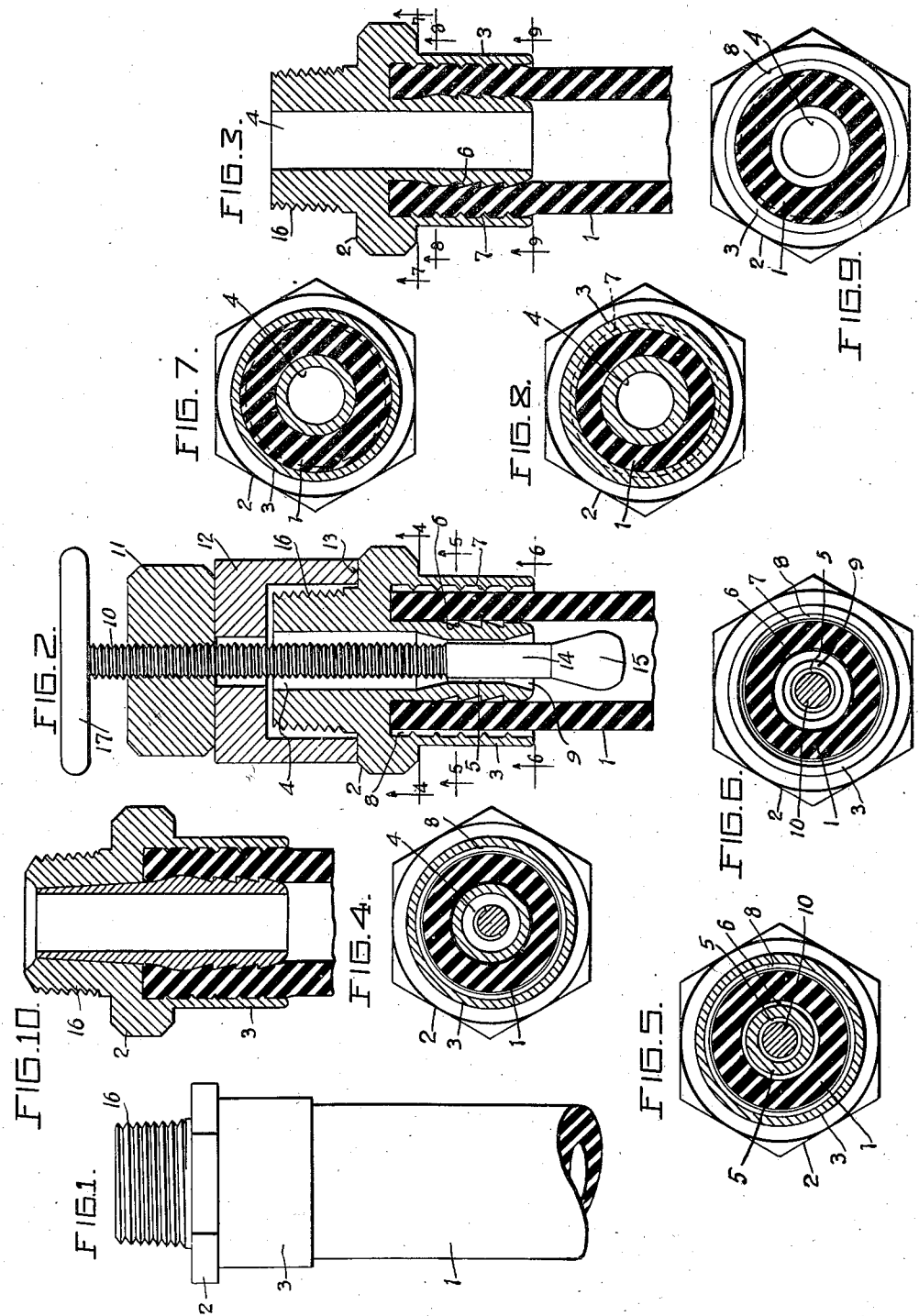

2,146,756

UNITED STATES PATENT OFFICE 2,146,756

PERMANENT HOSE COUPLING

William H. Miller, Royal Oak, Mich., assignor to The Flex-O-Tube Company, Detroit, Mich., a corporation of Delaware Application January 6, 1938, Serial No. 183,665

2 Claims. (Cl. 285—84)

This invention relates to improvements in hose connections and comprises a permanent hose coupling. The construction of this invention enables the user to connect a hose with a coupling proper in a simple and quick manner so that the hose and the coupling can be connected together wherever the hose is in use, whether in a shop, or in a factory for installation, or in a yard where the hose may be in use, or in a gasoline service station. This coupling is formed with a threaded connecting body and interiorly disposed and exteriorly disposed sleeves forming a hose receiving space therebetween. The interior surfaces of these sleeves are preferably corrugated. The internal sleeve communicates with an interior passageway of larger diameter. When the hose is inserted in the space between these sleeves, the interior sleeve is expanded to substantially the diameter of the internal passageway in the coupling. It thereby locks the resilient hose between the corrugations of the respective sleeves so that it cannot be drawn out longitudinally. By this construction, the external sleeve is not deformed in any manner.

These capacities of this invention are carried out by the construction hereinafter described in detail and shown in the accompanying drawing, in which Figure 1 is a view of a section of hose and the coupling as they appear from the exterior.

Figure 2 is a vertical sectional view of the tool I have invented for use in assembling and connecting together the hose and the coupling, and shows a coupling with the hose partially assembled and located in the tool.

Figure 3 is a longitudinal section through the coupling and the hose as they appear after treatment by the tool shown in Figure 2.

Figure 4 is a cross-sectional view of Figure 2 on the line 4—4, looking upward.

Figure 5 is another cross-sectional view of Figure 2 on the line 5—5, also looking upward.

Figure 6 is a cross-sectional view of Figure 2 on the line 6—6, again looking upward.

Figure 7 is a cross-section of Figure 3 on the line 7—7, looking upward.

Figure 8 is a cross-section on the line 8—8 of Figure 3, looking upward.

Figure 9 is a cross-section of Figure 3 taken on the line 9—9, also looking upward.

Figure 10 is a similar view to Figure 3 but showing a modification comprised of an inner sleeve to constitute the passageway for the liquid, while in Figure 3 this passageway is formed in the coupling itself.

This tool so illustrated and referred to here forms the subject matter of another application of mine filed of even date herewith and bearing Ser. No. 183,666. My purpose in illustrating this tool in this application is to facilitate an understanding of how the work of connecting the coupling and the hose together is performed.

Turning now to a description of this invention, it will be understood that a section of hose 1, such as shown in the several figures, is connected to the coupling generally designated by the numeral 2 in the manner presently to be stated. This coupling comprises a band 3 best shown in Figure 1 and this forms the outer wall of the coupling. The coupling is hollow as shown at 4 which designates the passageway for the fluid. The lower portion of this passageway is contracted as shown at 5 and has a series of circumferential shoulders indicated at 6.

The outer wall 3 is provided with interior circumferential ridges 7 which, like the shoulders 6, are to be imbedded in the wall of the hose by the operation presently to be described. But first we call attention to the fact that the coupling has a deep annular recess 8 which receives the hose freely and in position to be pierced or indented by the shoulders 6 and the circular ridges 7.

Another feature of the coupling is the flaring opening 9 at the lower end of the tubular extension 5. So much for the construction of the coupling as a whole. We now come to the parts which constitute the tool in which the coupling with its parts and the hose seated in its deep recess are to be acted on. This tube comprises a rod 10 threaded through a nut 11 which is mounted on a cap 12 which itself rests directly on the body of the coupling at 13. The rod extends down through the contracted opening within the lower portion 5 of the wall. This part of the rod is smooth as shown at 14 and terminates in a wedge-like body 15 with its smaller portion at its upper end, so that when the rod is screwed upward this wedge-like portion enters the flaring opening 9 and as the screw continues to be turned the wedge spreads the portions 5 of the inner wall outward.

The effect of this is to drive the shoulders 6 into the interior of the hose and to force the walls of the hose to come in contact with the annular ridges which penetrate to their depth into the hose. This operation definitely and strongly anchors that end of the hose to the coupling as seen in Figures 3 and 10. These latter figures show what the tool has accomplished in dealing with the coupling and the hose and also the effect on the lower part 5 of the inner wall which by the pressure of the wedge 15 presses the inner wall to the position shown in Figure 3. And this produces the passageway 4 for the flow of water, oil, or other liquid when the coupling is in use.

When this operation in its several steps has been completed, the coupling and the hose are locked together and ready for use, as when the threaded portion 16 has been coupled to the source of liquid as is desired to have flow through the coupling and the hose. The actuating threaded rod 10 is equipped with any suitable device or handle 17 by which to forcibly rotate the threaded rod in the direction which would throw the strain of drawing the wedge upward against and through the lower inner wall. In that case such strain would act to draw the nut down upon the cap 12.

And thus it will be understood that the assembly of the coupling and the hose may be performed by this tool anywhere it is desired to make that assembly.

And again, the coupling and its means for receiving and securing the hose is brought down to a construction of the utmost simplicity and cheapness and yet is capable of functioning reliably.

The internal passageway 4 is of slightly larger diameter than the internal passageway 5, after the latter is expanded, to facilitate the drawing through the space 4 of the head of the expanding tool. While this enlargement of 4 is not essential, yet it is convenient and useful.

It will be noted that while the rubber in the hose is compressed, it is nevertheless substantially uniform in cross-section, so that it will retain its full strength and at the same time is so anchored in the coupling that it cannot pull out of, or separate from, the coupling.

It is to be understood that the motion of the expander through the contracted water passageway is unidirectional and toward the nut. By rotating the nut in its proper direction (which is clockwise on the ordinary right-hand thread) the expanding head is drawn up through the entire passageway so that the entire tool may be lifted from the coupling when the head has reached the position indicated. There is no reason nor necessity for forcing the expander back down through the passageway because its work has been completed when it reaches the restricted zone of the passageway.

It will be understood that the above described structure is merely illustrative of the manner in which the principle of my invention may be utilized, and that I desire to comprehend within my invention such modifications as come within the scope of the claims and the invention.

Having thus fully described my invention what I claim as new and desire to secure by Letters Patent is:

1. A new article of manufacture for use as a coupling, comprising a coupling body exteriorly threaded at one end and having spaced internal and external sleeves at the other end to form a hose-receiving chamber, said internal sleeve forming with said body a continuous internal passageway, the intermediate portion of the wall of said sleeve being thickened inwardly of the passageway, said sleeve being adapted to be expanded outwardly to firmly grip the hose between the thickened portion and the outer sleeve.

2. A new article of manufacture for use as a coupling, comprising a coupling body exteriorly threaded at one end and having spaced internal and external sleeves at the other end to form a hose-receiving chamber, said internal sleeve forming with said body a continuous internal passageway, the intermediate portion of the wall of said sleeve being thickened inwardly of the passageway, said internal sleeve having a conically tapered portion at its outer end and another conically tapered portion at its inner end and being adapted to be expanded outwardly to firmly grip the hose between the thickened portion and the outer sleeve.

WILLIAM H. MILLER.